Figure 1:
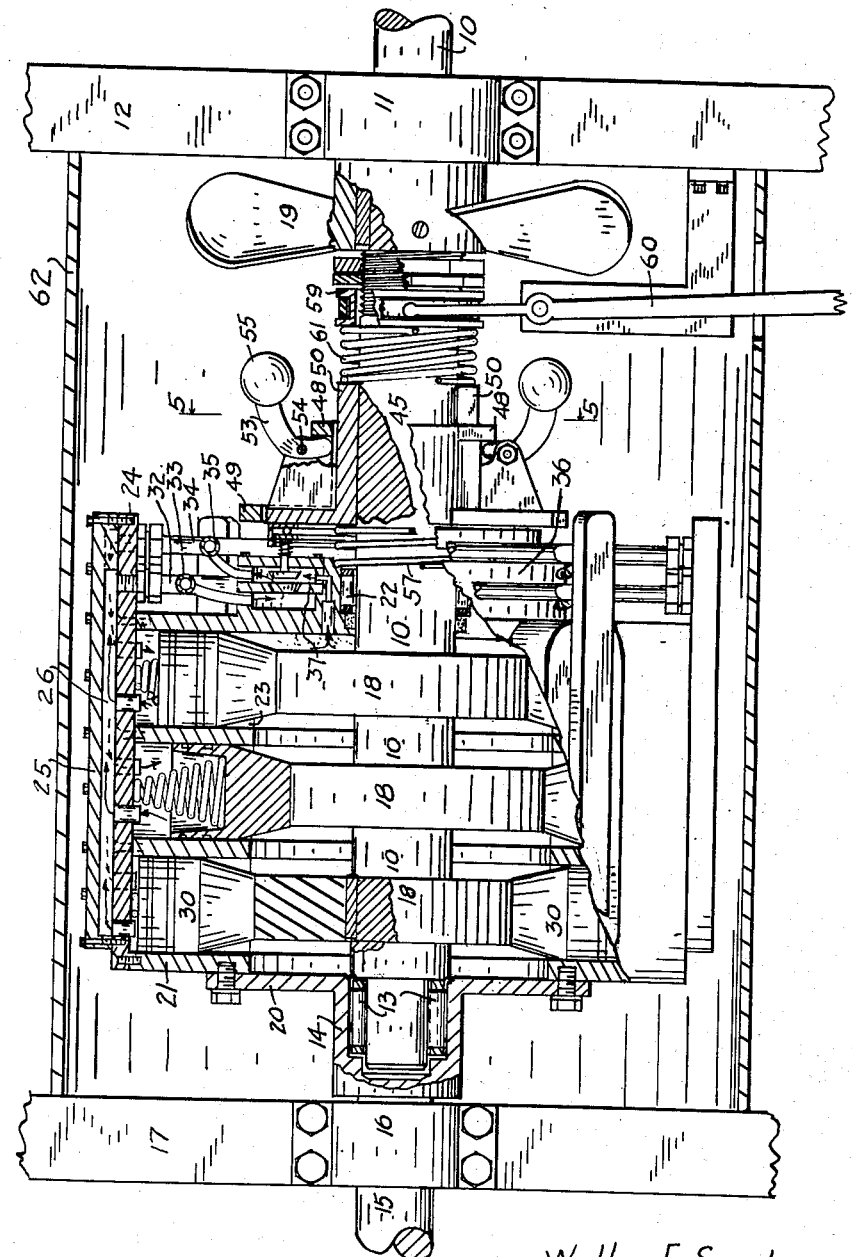

March 2, 1954  W. F. SANDERS  2,670,827
HYDRAULIC CLUTCH-TRANSMISSION MECHANISM
Filed Nov. 19, 1948  3 Sheets-Sheet 2

Walter F. Sanders
INVENTOR

BY
ATTORNEY

March 2, 1954  W. F. SANDERS  2,670,827
HYDRAULIC CLUTCH-TRANSMISSION MECHANISM

Filed Nov. 19, 1948  3 Sheets-Sheet 3

Walter F. Sanders
INVENTOR

BY
ATTORNEY

Patented Mar. 2, 1954

2,670,827

UNITED STATES PATENT OFFICE 2,670,827

HYDRAULIC CLUTCH-TRANSMISSION MECHANISM

Walter F. Sanders, Tacoma, Wash.

Application November 19, 1948, Serial No. 60,958

2 Claims. (Cl. 192—60)

This invention relates to means connecting a driving shaft to a driven shaft, and especially to such means as involves the use of a fluid, and more particularly to means to cause the free circulation of the fluid in passages in the apparatus when the clutch is entirely released, and to means to restrict such free circulation whereby a drag between the driving shaft and the driven shaft will result, the extent of slippage between said shafts being controlled by valves restricting such flow, and whereby, when such valves are entirely closed, the driving and driven shafts are coupled and turn in complete unison.

A brief statement of the general object of my invention is as follows: When an internal combustion engine is required to drive heavy machinery, as in army tanks, hoisting apparatus, trucks, ships, etc., there is a heavy strain on the clutch and on the transmission gear when they operate on the same general plan as are the clutch and gearing of a comparatively light passenger automobile, often resulting in stalling the engine or in damage to the machinery, due to the shock strains therein. In order to overcome this and other difficulties I have devised the herein described combined clutch and transmission gear which operates entirely in oil and which controls the respective speeds of the driving and driven shafts by controlling the flow of this oil within the apparatus, thus permitting the free flow of the oil when the clutch is released and restricting it when it is desired to turn the driven shaft, thus relieving the engine and machinery from shock.

A further object is to provide a mechanism which will automatically control said valves in accordance with the speed of rotation of the driving shaft, so that an increase of such speed will result in an increase of the clutching action and a corresponding reduction in the slippage between the two shafts. The effect of this automatic control, when my apparatus is installed in a heavy truck, is to entirely eliminate the loss of momentum of the truck which would occur when the usual transmission gear is shifted from high to low gear, upon reaching a hill, so that the engine speed is maintained at a constant speed while the slippage caused by changes in the grade will be automatically controlled to conform to the required force needed to handle the grade. Also this apparatus will be materially lighter than the transmission gearing at present required by heavy trucks; and the wear of such gear, as well as the first cost of such gearing is eliminated.

Figure 2:
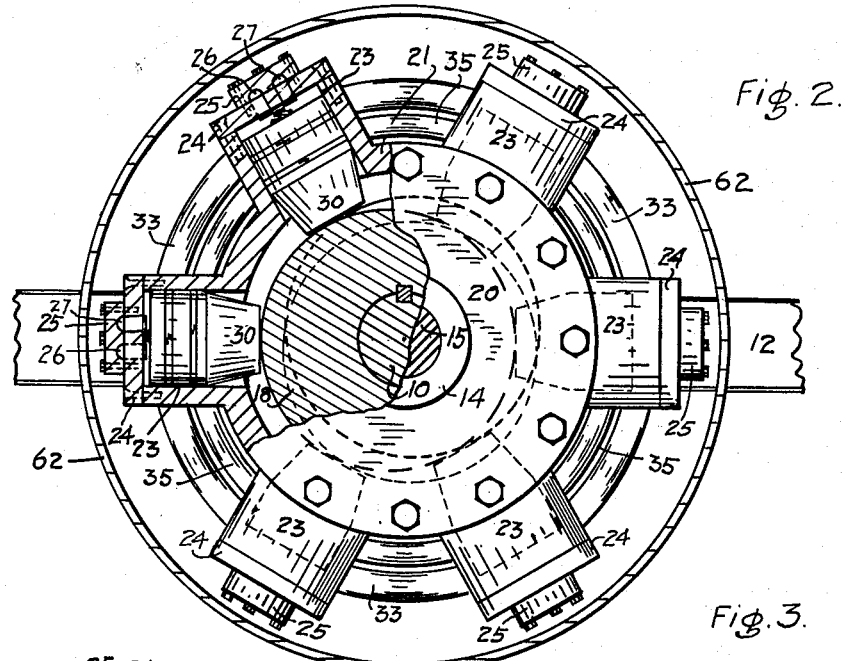
Figure 3:
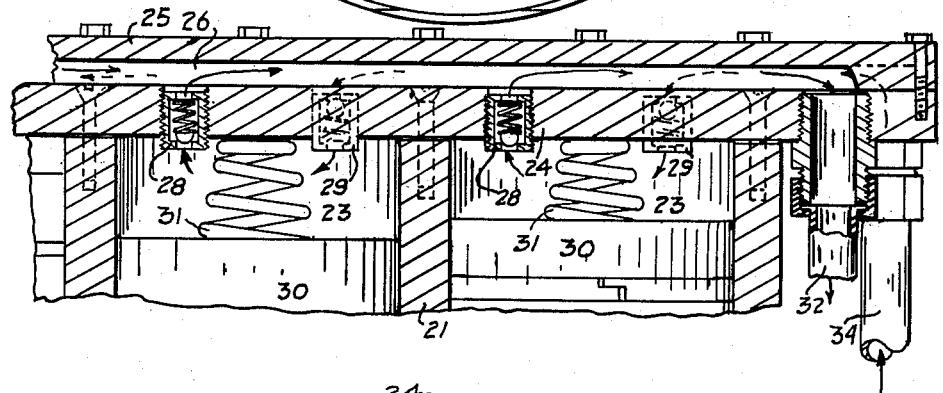
Figure 4:
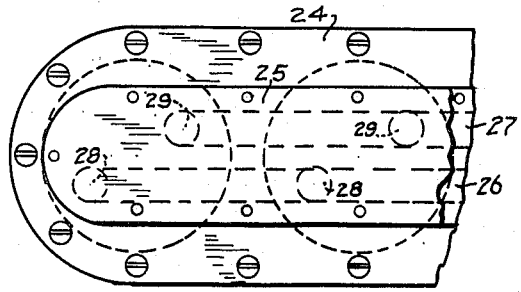
Figure 5:
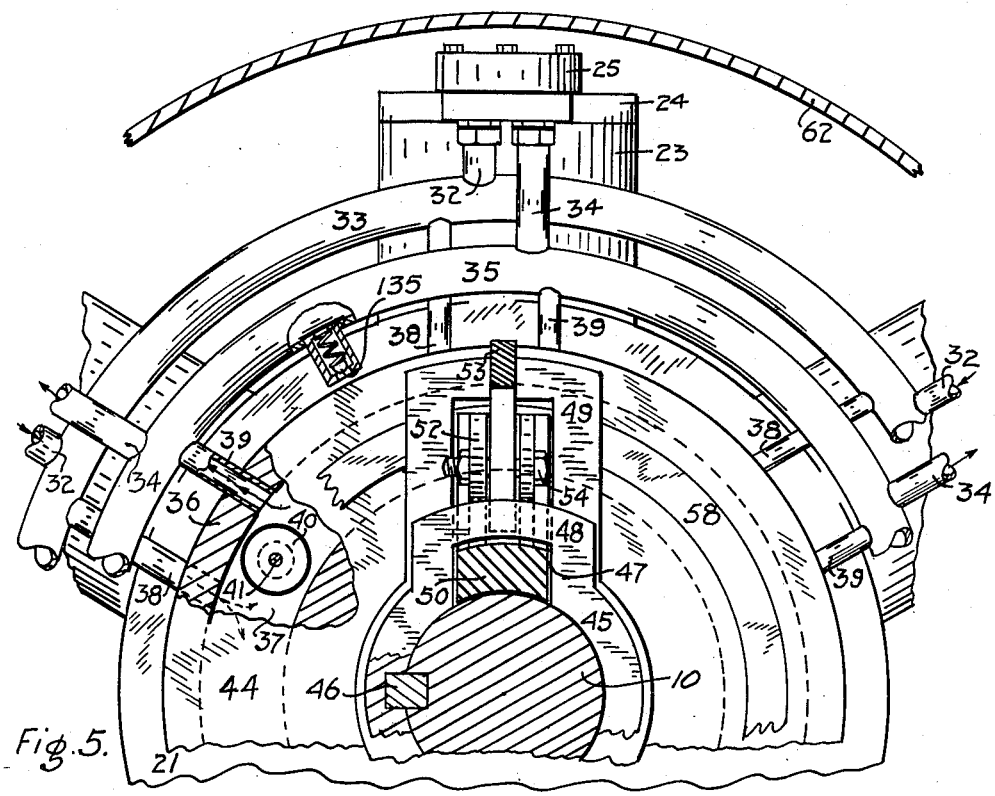
Figure 6:
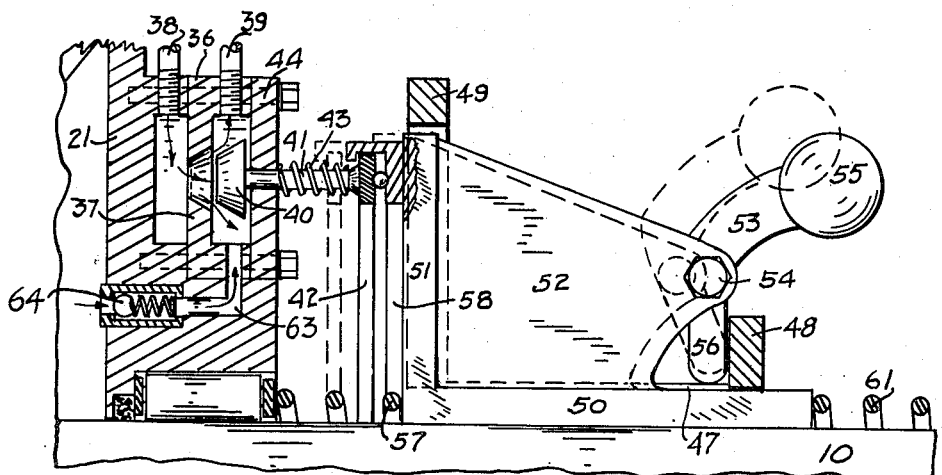

I attain these and other objects as will be apparent to those skilled in the art by the devices, and arrangements illustrated in the accompanying drawings; in which:

Fig. 1 is an elevation of the mechanism, with parts partly broken away to reveal the construction; Fig. 2 is a rear end elevation, showing parts broken away to reveal the construction; Fig. 3 is an enlarged section of the upper part of two alined cylinders and their common cap; Fig. 4 is a partial plan view of one of the cylinder heads; Fig. 5 is an elevation of the front end of the mechanism, taken from the line 5—5 in Fig. 1; and Fig. 6 is a section through the valve chamber showing the means for automatically operating the valves.

Identical numerals of reference refer to the same parts throughout the several views.

This apparatus comprises a multiple number of floating pistons operated outward in their cylinders by their contact with rotating cams and impelled inward into contact with said cams by means of springs. The outer sides of the pistons cause an alternate pressure and suction on the fluid in the cylinders in which the pistons are moved by the cam or by the springs. Check valves direct the flow of the fluid into or outward of the cylinders in two passages which are connected together in a valve-controlled passage, whereby the resistance to motion of the floating pistons is controlled and, therefore, whereby the slippage between the cams and the pistons is controlled. The cams are mounted on the driving shaft and the pistons are mounted on the driven shaft, so that when the valves in the control passage are fully open the driven shaft is free from motion, while if they are fully closed, the pistons grip the cams and the two shafts turn in unison. Intermediate positions of the valves cause the driven shaft to turn at intermediate speeds in relation to the driving shaft.

This clutch-transmission mechanism consists of a driving shaft having three eccentric circular cams thereon, rotating in line with three sets of six cylinders each, formed in the cylinder block. This cylinder block is secured to and rotates with the driven shaft. The three eccentrics are set at 120° angle apart, and the three cylinders in each row are in radial alinement therewith and are in rows parallel with the axis of the driving shaft. The axes of the six cylinders forming one set are radial from the driving shaft and are spaced 60° apart.

Each fluid-filled cylinder has a floating piston extending centrally therefrom into engagement with its eccentric cam, being impelled there-against by a spiral spring. The cylinder head of each row of three alined cylinders contains two parallel passageways, with an outlet check valve connecting each said cylinder with one said passageway, which therefore carries the pressure or outgoing fluid under the action of the cam, and with an inlet check valve connecting each said cylinder with the other said parallel passageway, which therefore carries the suction or inflowing fluid under the action of the spring. Each of these cylinder heads has two pipe elements which connect the said pressure and suction passages to two separate circular manifolds, one manifold for all the six pressure passages and one for all the complementary suction passages. These two manifolds are respectively connected to two concentric chambers in the front end of the cylinder block, and the wall dividing said chambers has a plurality of passages therethrough, connecting the said chambers together, each said passage being controlled by a valve whereby the flow of fluid from the pressure side of the wall to the suction side thereof may be controlled, thus controlling the flow of the fluid and the slippage between the floating pistons and the eccentric cams. The extent of opening of the said valves governs the resistance of the fluid to free passage in said passageways, and so governs the resistance to motion by the pistons, and since they are floating between the springs and the cams, an increase in said resistance decreases the said slippage.

The extent of opening of the several said valves is controlled by the position of a ball-bearing ring which engages all the stems of said valves, and the position of the said ring is automatically controlled by centrifugal governors mounted on and turning with the driving shaft.

The two governors are mounted on longitudinally sliding members which are mounted in slots in a sleeve member keyed to the driving shaft and against which the governors pry the sliding member to move it longitudinally according to the speed of the driving shaft. These sliding members engage a ring forming one member of the said ball-bearing. This member rotates with the driving shaft, while the other member thereof rotates with the cylinder block.

The driven shaft is secured to the cylinder block and is turned at a rate dependent upon the relative opening of the control valves, as above stated. When the valves are all closed there can be no circulation of the fluid and therefore no reciprocation of the pistons which, therefore, grip the cams, thus causing the two shafts to turn in unison, but as the valves are opened the floating pistons release some of their grip on the cams and permit a relative slip between them and the cams, and thus the driven shaft turns slower than the driving shaft, and in this way the above mechanism acts as a transmission gear as well as a clutch.

Referring, now, to the drawings, it will be seen that the driving shaft 10 passes through the clutch mechanism, being journaled in the bearing 11 mounted on the frame member 12, and also in the end bearing 13 within the boss 14 formed on the end of the driven shaft 15. The driven shaft 15 is journaled in the bearing 16 mounted on the frame member 17.

This driving shaft 10 is provided with three circular eccentric cams 18 mounted thereon in spaced relation and of equal eccentricity, and having their eccentric centers set at 120° apart. A suitable fan 19 is also secured on the front portion of the shaft 10 and is adapted to send a cooling draft through the entire mechanism.

The driven shaft 15 is provided with a hollow boss 14 at its front end, said boss containing the bearing 13 and having a circular flange 20 extending laterally concentric therewith. This flange 20 is secured to the rear face of the cylinder block 21. The front end of the cylinder block 21 is journaled on the driving shaft 10 by the roller bearing 22.

The cylinder block 21 is provided with eighteen cylinders in three sets of six cylinders each, said cylinders 23 all opening inward into the hollow portion of the block 21.

Each row of three cylinders 23 is provided with a cap plate 24 (Fig. 3) secured to the block 21 and closing said cylinder ends. Each said cap plate 24 is provided with an outer plate 25. Each outer plate 25 is provided with two separate passages 26 and 27, extending parallel therein.

The cap plate 24 is provided with passages having three outward-opening check valves 28 connecting the respective three cylinders 23 with the outgoing passage 26, and with passages having three inward opening check valves 29 connecting the ingoing passage 27 with the said cylinders 23.

Each cylinder 23 is provided with a floating piston 30 which reciprocates therein, each said piston extending inward beyond the cylinder walls into engagement with its cam 18 and being reciprocated outward thereby. Each piston is provided with a spiral spring 31 mounted between its outer end and the cap plate 24, said spring being adapted to counteract the centrifugal force exerted on the piston by their rotation with the block 21 and to keep said pistons in contact with said cams. The entire free space in the block and passages is filled with a suitable fluid, such as oil.

The rotation of the driving shaft 10 with its cam 18 causes the pistons 30 to reciprocate outward in the cylinders 23 against the actions of the springs 31 and causes a flow of the internal fluid outward from the said cylinders 23, through the check valves 28, into the passages 26 on the respective outward strokes, and from the passages 27 through the check valves 29 into the said cylinders 23 on the complementary inward strokes under the compulsion of the springs 31. And this flow is free if the control valves are fully open thus permitting the driven shaft to remain immobile since its resistance to turning will be greater than the small drag due to the resistance to motion of the fluid.

The six caps formed by the plates 24 and 25 each overhangs the front end of the clutch (Figs. 1, 3) and their six high pressure passages 26 (Figs. 3, 5) are connected by short pipes 32 with the high pressure manifold 33. Similarly the six low pressure passages 27 are connected by short pipes 34 with the low pressure manifold 35.

The check valve 135 (Fig. 5) is connected to the low pressure manifold 35, and is for the purpose of preventing the development of a partial vacuum in the said manifold. Since the valve 135 is on the inner side of the manifold 35, the oil in the manifold will, under centrifugal force, lie on the outer side of the manifold, so that the valve 135 will admit air to the inner side of the manifold thereby stopping the formation of a vacuum.

The manifolds 33 and 35 preferably encircle the axis of the shaft 10 a short distance inward from the overhang of said cap plates 24 and act to cool the fluid therein as well as to equalize the pressure therein. If desired they may be provided with fins to aid in such cooling action.

A hollow control boss 36 is formed on the front of the block 21 and is divided by a central plate 37 into two chambers. The high pressure manifold 33 is connected into the high pressure side of the central plate 37 by the connecting pipes 38 (Fig. 5) and the low pressure manifold 35 is connected into the low pressure side of the said central plate 37 by the pipes 39. One or more passages (Fig. 6) pass through the dividing plate 37, each passage being controlled by a valve 40 mounted in the low pressure chamber and axially movable therein to close or open the said passage. Each valve 40 is mounted on a stem 41 which passes through the end plate 44 and is kept in engagement with the ring plate 42 by the springs 43.

The position of the ring plate 42, and therefore of all the valves 40, is governed by means of the following controlled automatic mechanism. Referring principally to Figs. 1, 5 and 6 it will be seen that the driving shaft 10 is provided with a sleeve 45 secured thereto by a suitable key 46. The sleeve 45 is provided with two channels 47 positioned next to the shaft 10 and suitably spanned by the front end bridge 48 and the rear end bridge 49. Two sliding members 50 are mounted in these channels 47 and each said member is provided with a flange 51 extending radially from its rear end. Each said member 50 is also provided with two parallel ears 52, said pairs of ears being adapted to hold one of the two governor levers 53 pivoted between them at 54.

The two governors each consists of a weight 55 mounted on the end of the lever 53 and having an inner end 56 which engages the rear side of the bridge 48. Thus, as the weight 55 tends to fly outward under the action of centrifugal force, the end 56 applies a pressure on the sleeve bridge 48 to slide the member 50 towards the block 21. This action is opposed by a spring 57 mounted between the boss 36 and the sliding member 50. The two flanges 51 of the two sliding members 50 engage one ring member 58 of a ring ball bearing, the other member of which is the above described ring plate 42 which engages the valve stems 41 to move them. Thus the movement of the slide members 50 under the centrifugal force applied to the weights 55 closes or opens the said valves 40 in the passages connecting the high with the low pressure chambers in the boss 36.

The action of this automatic control is itself controlled by means of a grooved sleeve 59, which is movable on the shaft 10 by means of a lever 60 and which engages a spring 61 mounted between it and the said sliding members 50.

A suitable cover 62 may enclose the mechanism and may be secured to suitable frame members represented by the parts 12 and 17.

As shown in Figs. 1 and 6, I provide a passage 63 leading from the inner chamber of the block, in which the cams 18 rotate, to the low pressure side of the dividing plate 37 in the boss 36, thus preventing the building up of pressure in the block and returning the surplus oil to the low pressure side of the apparatus. This passage 63 is controlled by the outward-opening check valve 64.

Thus it will be seen that, if the load on the driven shaft is released or diminished, the driving shaft will momentarily increase in speed with the resultant increase in speed of the governor balls, which therefore will tend to fly outward and will move the sliding members, together with the ball-bearing ring, toward the block, closing or partially closing the valves and speeding up the driven shaft and tending to equalize its speed with that of the driving shaft, and therefore increasing its resistance and holding down the speed to normal.

It is, of course, understood that many changes may be made in the details of construction of my improved clutch and power transmission without departing from the spirit of my invention as outlined in the appended claims.

What I claim and desire to secure by Letters Patent, is:

1. In a hydraulic clutch transmission, a frame, a driving shaft journaled in an end of said frame, a driven shaft journaled in said frame and rotatably engaging an end of said drive shaft, a plurality of circular cams mounted in spaced relation on said drive shaft and having their eccentric centers spaced 120° apart, a circular flange extending from said driven shaft, a block having its rear face secured to said flange, said block being provided with a plurality of cylinders, an inner cap plate closing the ends of said cylinders and secured to said block, an outer cap plate secured to each of said inner plates and each of said inner plates provided with a pair of passageways, check valve means for controlling passage of fluid into and out of said cylinders, a piston reciprocally arranged in each of said cylinders and engaging said cams, a coil spring interposed between said pistons and said inner cap, a high pressure manifold and a low pressure manifold connected to said passageways, a hollow control boss formed on the front of said block, a control plate having passages therein, said control plate providing high and low pressure chambers in said control boss, an outwardly opening check valve located in said block between said piston and said driving shaft opening into said low pressure chamber, said pressure chambers being connected to said passageways, a valve mounted for movement into and out of bridging relation with respect to said control plate for regulating fluid flow into said low pressure chamber, a stem secured to said valve, a coiled spring circumposed on said stem, a ring plate arranged in engagement with said stem, and means for automatically controlling the position of said ring plate, said means comprising a sleeve secured to said drive shaft and provided with a pair of channels, sliding members mounted in said channels and each provided with a flange extending radially from its rear end, a pair of spaced parallel ears extending from each of said sliding members, a governor lever pivotally mounted between each pair of ears, a weight mounted on each of said levers, resilient means circumposed on said drive shaft and abutting said sliding members, a grooved sleeve slidably mounted on said drive shaft, and resilient means interposed between said sleeve and said sliding members for controlling movement of said sliding members.

2. The apparatus as described in claim 1 wherein each of said resilient means comprises a coil spring.

WALTER F. SANDERS.

References Cited in the file of this patent

UNITED STATES PATENTS

| Number | Name | Date |
|---|---|---|
| 1,249,201 | Robinson | Dec. 4, 1917 |
| 2,026,777 | Dumble | Jan. 7, 1936 |
| 2,213,616 | Semon | Sept. 3, 1940 |
| 2,427,570 | Niemann | Sept. 16, 1947 |